Figure 1:
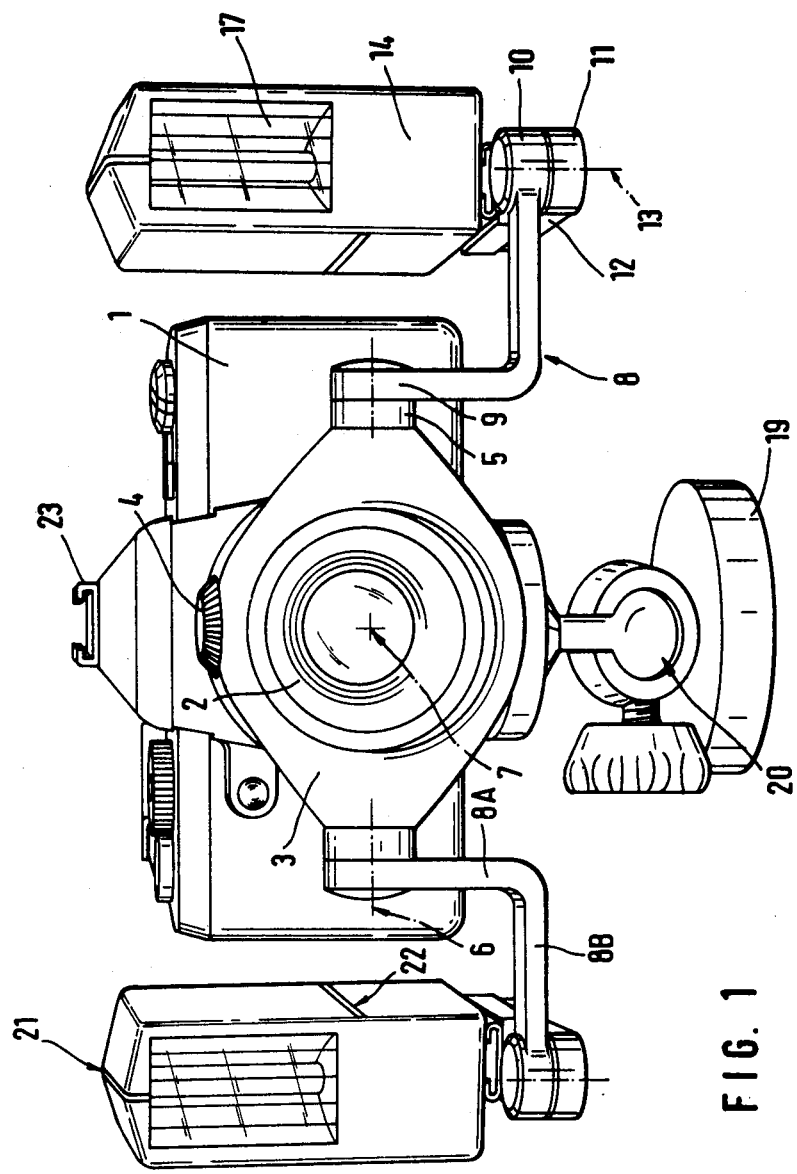

United States Patent [19]

Östlund et al.

[11] 4,392,183
[45] Jul. 5, 1983

[54] DEVICE IN CONNECTION WITH CAMERAS

[76] Inventors: Roland Östlund, Furuslätten 60, 42700 Billdal; Rolf Östlund, Trädesvägen 15, 44600 Alvängen, both of Sweden

[21] Appl. No.: 268,182

[22] Filed: May 29, 1981

[30] Foreign Application Priority Data

May 30, 1980 [SE] Sweden .............................. 8004046

[51] Int. Cl.³ ........................................... G03B 15/02
[52] U.S. Cl. ...................................... 362/11; 362/18; 362/17; 362/239; 362/250; 362/283; 362/285; 362/275
[58] Field of Search ..................... 362/11, 17, 18, 239, 362/250, 283, 285, 275

[56] References Cited

U.S. PATENT DOCUMENTS 4,176,932 12/1979 Young et al. ........................ 362/11
4,201,434 5/1980 Tureck ................................. 362/11
4,298,907 11/1981 Holt ..................................... 362/11

*Primary Examiner*—Stephen J. Lechert, Jr.

[57] ABSTRACT

The invention relates to a device in connection with cameras for the support of flashlight units (14) on the socket (2) of the lens of the camera, so that the respective flashlight unit (14) will be supported in a laterally displaced manner relative to the central axis (7) of the lens.

By means of the present invention a device is obtained, which among other things is suitable to use in connection with macrophotography, as the device can be handled in a rapid, simple and effective manner, and as the flashlight units (14) used will be located near to the front of the lens and follow the movements thereof.

The device comprises a holder (3), which is arranged to be attached to the socket (2) of the lens of the camera at the front portion of the same. At least two pivoted flashlight supporting pivoting arms (8) are supported on this holder (3), the pivoting axes (6) of which arms (8) being located in diametrically opposed positions each one on its side of the socket (2) of the lens and extending at right angle relative to the central axis (7) of the lens. Each respective arm (8) at its end facing away from said pivot bearing (5, 9) exhibits a swivelling bearing (10, 11) where a swivelling arm (12) supporting the flashlight unit (14) is pivoted.

9 Claims, 6 Drawing Figures

DEVICE IN CONNECTION WITH CAMERAS

The present invention relates to a device in connection with cameras for the support of flashlight units on the socket of the lens of the camera, so that the respective flashlight unit will be supported in a laterally displaced manner relative to the central axis of the lens.

It is a principal object of the present invention to provide a device of the kind mentioned above, which among other things is adapted for use in connection with macrophotography by making it possible to adjust the flashlight units in the desired positions in a rapid, simple and exact manner without having to use movable screws, knobs or similar, and also making it possible to facilitate the location of the flashlight unit close to the front of the lens, where it can follow the movements of the lens and compensate for luminous losses in the camera, such a device moreover being well adapted for use in connection with a number of different flashlight types and photographing positions.

Said object is reached by means of a device designed according to the present invention, which is substantially characterized by a holder which is arranged to be attached to the socket of the lens of the camera at its front portion supporting at least two pivoted flashlight supporting pivoting arms, the pivoting axes of which occupy diametrically opposed positions each one on its side of the socket of the camera lens and extend at right angle relative to the central axis of the socket of the lens, and by the respective arm at the end of the same facing away from said pivot bearing exhibiting a swivelling bearing, where a swivelling arm supporting the flashlight is pivoted.

Figure 2:
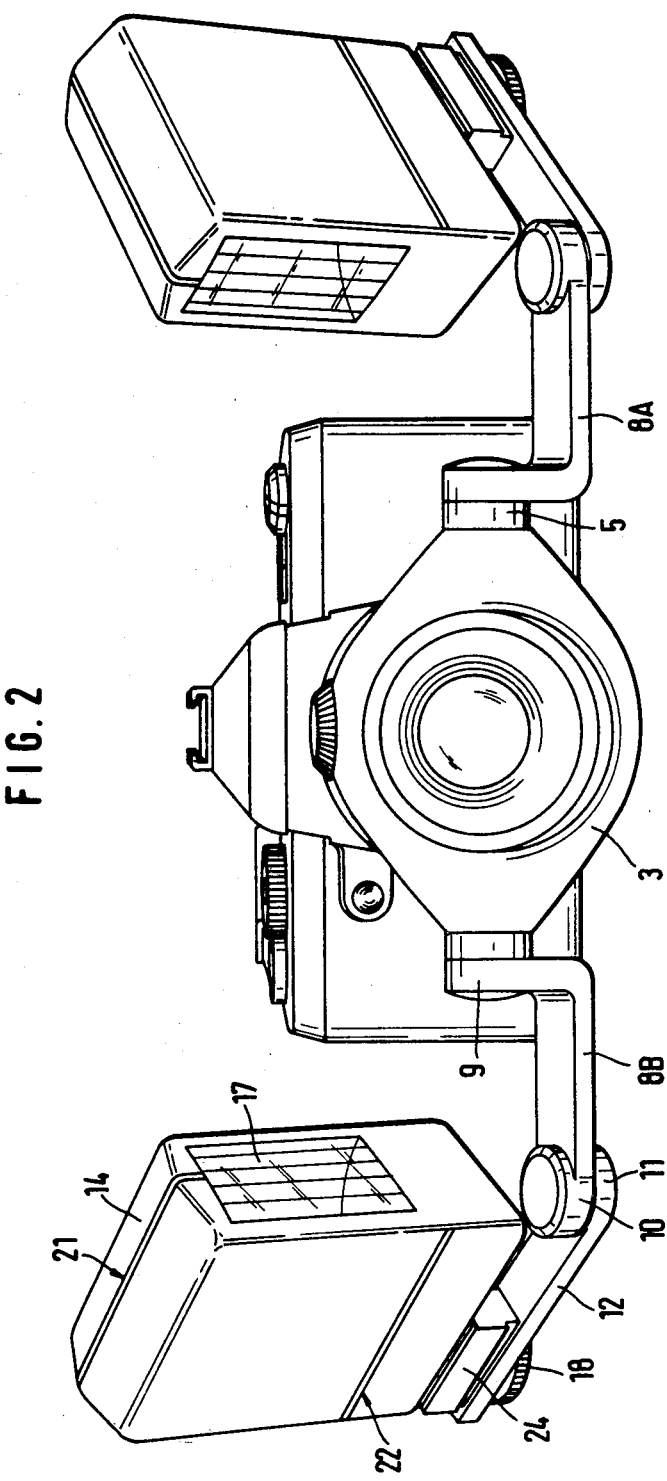
Figure 3:
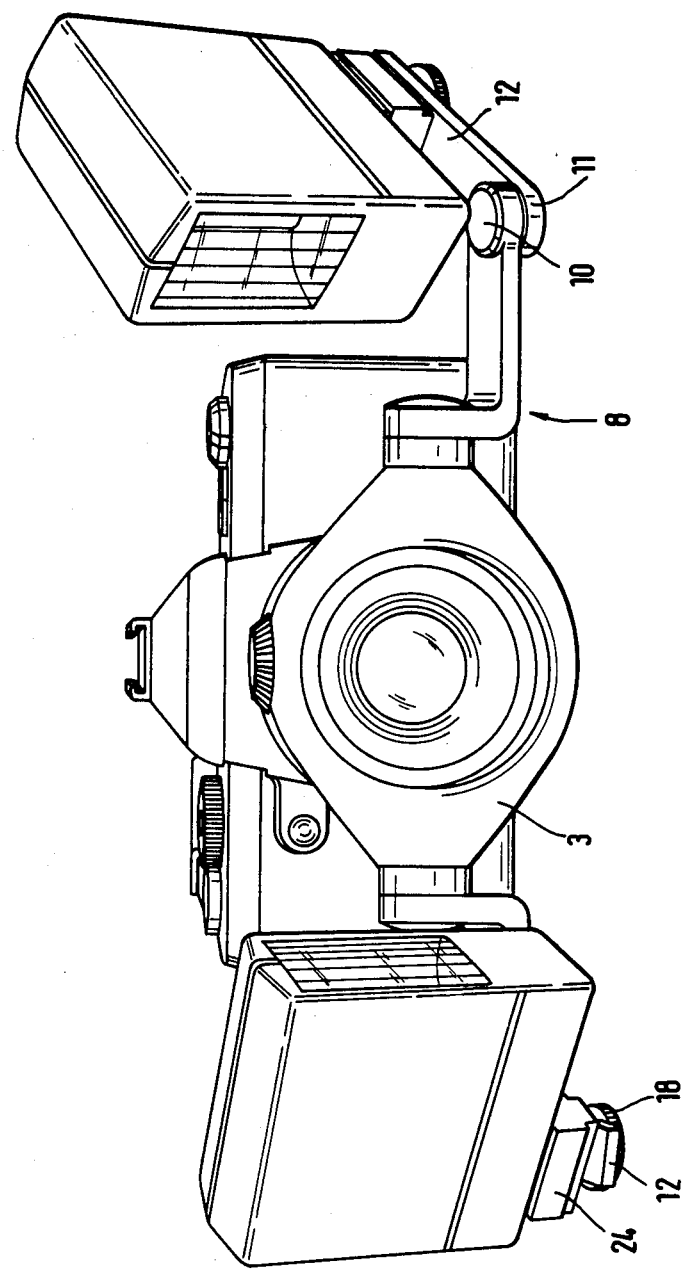
Figure 4:
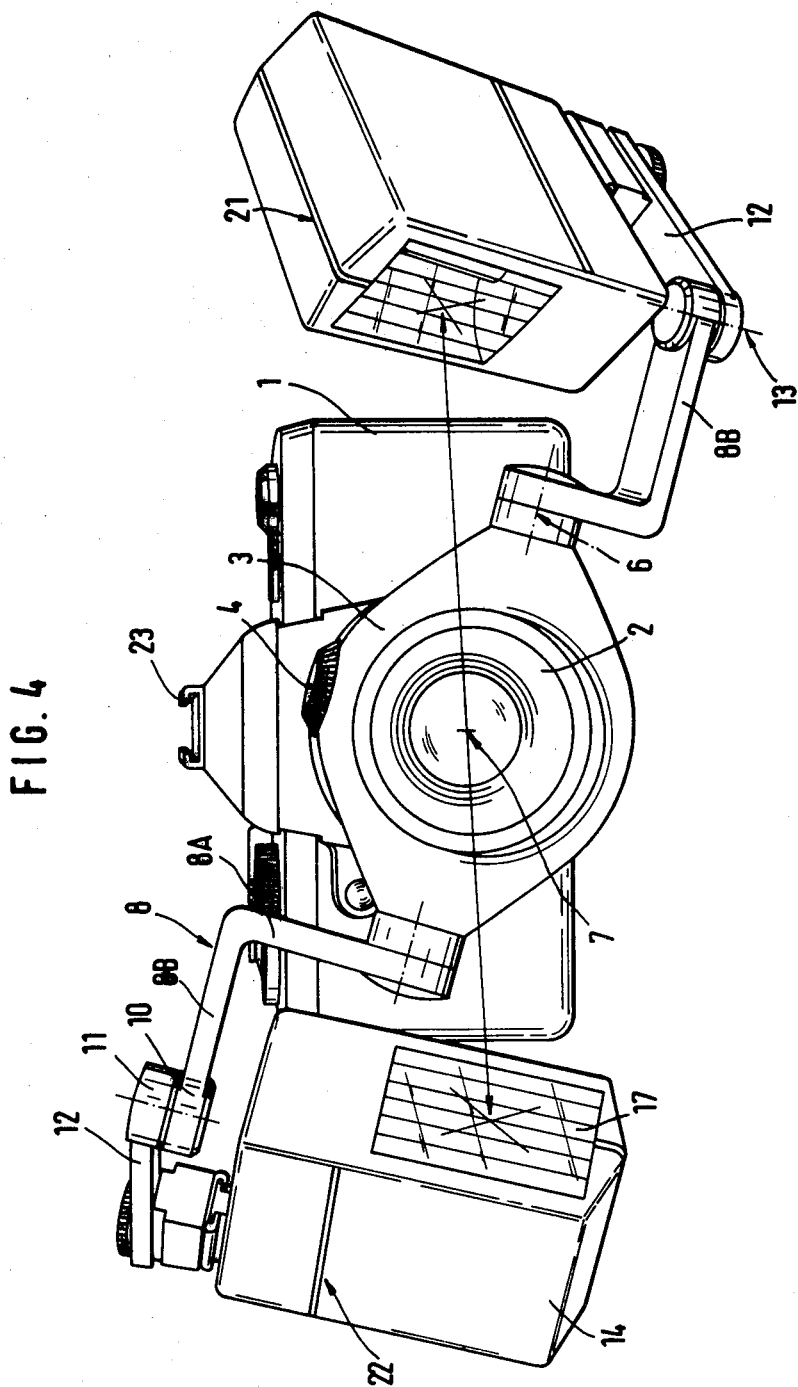
Figure 5:
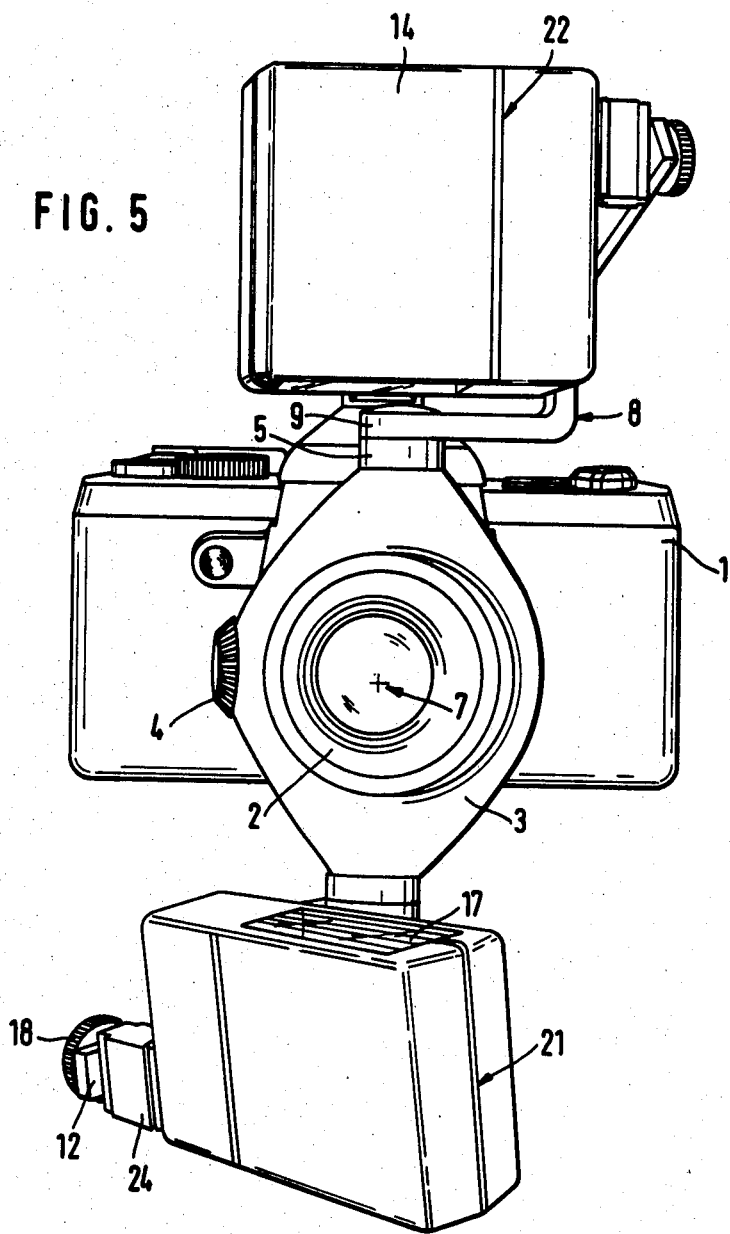
Figure 6:
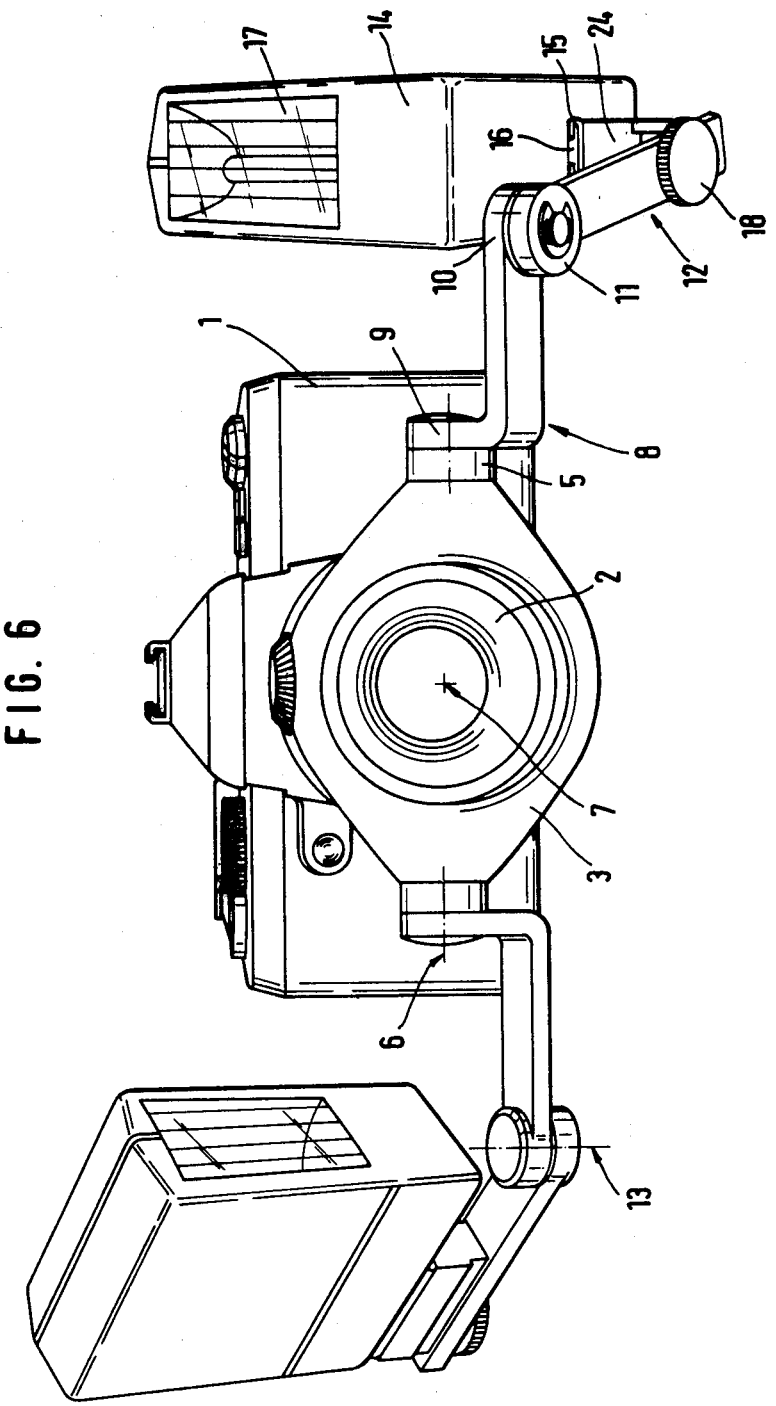

An embodiment of the invention is described in the following, reference being made to the accompanying drawings, in which FIG. 1 is a view of the flashlight units in a basic position, in which they face forwards, FIG. 2 is a view of the flashlight units in forwards pivoted and swung-out position in order to provide a uniform light coming somewhat from above, FIG. 3 is a view of one of the flashlights in the same position as in FIG. 2, whereas the other flashlight is pivoted forwards and also swung forwards in order to provide a sweeping light and an easying-off light in order to mark structures, FIG. 4 is a view of the holder in a somewhat pivoted position round the socket of the lens, one of the flashlights being pivoted forwards and in outwards direction occupying an angular position, whereas the other flashlight is turned through 180° relative to the first flashlight and pivoted in outwards direction occupying an angular position for by way of example reproduction photography, FIG. 5 is a view of the flashlights occupying a vertical position, in which they provide a sweeping light, and FIG. 6 is a view of the flashlights occupying positions, in which they provide direct light and reflecting light respectively.

In the FIGS. 1–6 a camera casing is indicated with 1 and the socket of its lens with 2. A holder, which in the drawings is indicated with 3, and which comprises a substantially ring-shaped part exhibiting such an inner diameter that it can be threaded on the front portion of the socket 2 of the lens or on an adapter screwfastened in the female thread of the socket 2 of the lens, is provided with a stop screw 4, which serves the purpose to lock the holder 3 to the socket 2 of the lens. The holder 3 exhibits two pivot bearings diametrically opposing each other on each side of the socket 2 of the lens, the pivoting axes 6 of said pivot bearings extending at right angle to the central axis 7 of the socket 2 of the camera lens. An angled arm 8 is pivoted on each one of said pivots 5 by means of a bearing 9 located at one end of said arm 8, which bearing 9 together with the pivot 5 forms a pivoting bearing arrangement on the holder 3. Said angled arm 8 exhibits an angular bend of 90°, and the length of the two sections 8A and 8B respectively of the angled arm is preferably the same. At the one end of the angled arm 8, that occupies a position at a distance from said pivot bearing 5, 9, there is an additional bearing 10, which is designed in a manner similar to the pivot bearing 9. A similar bearing 11 provided at one end of a swivelling arm 12, which is designed as a straight flat bar, cooperates with said additional bearing 10. Thus, this swivelling arm 12 is arranged to be swivelled round the common pivot axis 13 of the pivot bearings 10, 11. This pivoting axis 13 forms a right angle to the pivoting axis 6 and said axes 7, 13 being in the same common plane.

The pivoting bearings 5, 9 and 10, 11 are not pivoted with locking screws and similar knobs for the locking of the arms in the chosen positions. The pivot bearings 5, 9 and 10, 11 respectively are instead suitably designed as friction locking bearings, and the arms 8, 12 consequently remain in the positions into which they have been pivoted or swivelled respectively. The pivot bearings 5, 9 and 10, 11 respectively can also be designed in such a manner that they can constitute transmission means between the flashlight unit and the flashlight actuating mechanism of the camera 1, so that any loose flexible coords are not required for this purpose. Shims can by way of example be provided in the pivot bearings for this transmission purpose, and if the arms 8, 12 are made of electrically conducting metal material, or if electric conductors are laid in the arms 8, 12, this transmission can be totally enclosed in the arms 8, 12. At the free ends of each one of the swivelling arms 8, 12 there are attachment means 24 designed to support a flashlight unit 14 of conventional type. These attachment means 24 are by way of example designed as a slide shoe 15 for the flashlight unit and adapted to receive the slide shoe coupling 16 of the flashlight unit 14, said slide shoe 15 preferably also being pivoted on the arm 12. The flashlight unit 14 is locked in any desired locking position relative to the swivelling arm 12 by means of a locking screw 18 provided on the arm 12 on the side thereof facing away from the flashlight unit 14, and said swivelling movement takes place round an axis, which is parallel to said pivoting axis 13. Also the locking screw 18 can be designed as a friction locking pivot bearing.

As is evident from FIG. 1 the length of the two angled arm sections 8A is chosen in such a manner that the window 17 of each respective flashlight unit 14 will occupy a position somewhat above the centre of the height centre of the socket 2 of the lens, when the flashlight units 14 and the arms 8, 12 occupy the basic position illustrated in FIG. 1, whereby a natural light exposure of the object to be photographed will be obtained.

In connection with macrophotography the camera 1 is by way of example mounted on a stand 19 by means of a locking device designed as a ball joint 20, and the lens is trained on the object to be photographed. In case a mirror reflex camera is used, the flashlight holder 3 and the flashlight units 14 mounted on the same follow in the movement of the socket 2 of the lens, when the latter one is focused on the object for example by being moved outwards, which by way of example takes place by means of bellow draw, and compensates for the luminous loss in the camera 1. In the basic position the flashlight units 14 will be located in the same plane as the front of the socket 2 of the lens and will always occupy the same position relative to the front of the socket 2 of the lens as counted in the longitudinal axis 7.

As is shown in FIG. 2, the flashlight units 14 can be pivoted and swivelled by means of the arms 8, 12 in such a manner that a flashlight is obtained, which is uniform and is emitted from a level located somewhat higher than the centre line 7 of the lens.

A setting of the flashlight unit, that produces a natural and creative live exposure of the picture within as well as outside of the macrorange and which by way of example can find application in medical photography by cutaneous specialists or dentists is shown in FIG. 3. One of the flashlights 14 then produces a sweeping light, which brings the structure of the object to be photographed into strong relief, whereas the other flashlight provides an easying-off of shadows from the sweeping light.

In FIG. 4 both the flashlights are set for horizontal reproduction photography within and outside of the macrorange by one flashlight having been turned upside down, whereby one gets the light from each side through the centre 7 of the lens by way of example when photographs are made of stamps. It is also possible to pivot each one of the straight arms 12 parallelly to the respective angled arm 8 in straight-out direction from the centre and thereafter only pivot the flashlight 14 against the object to be photographed in order to avoid reflexes for example in connection with reproduction photography through glass panes.

In FIG. 5 the flashlights 14 are set for vertical reproduction photography.

In FIG. 6 a flashlight position is finally illustrated, in which one flashlight produces a direct light, whereas the other flashlight is directed towards by way of example a ceiling, so that it produces a reflexing light.

On its top side and plane sides the flashlight units 14 preferably are provided with markings, which in the illustrated embodiment comprise marker scores 21 and 22 respectively, which are useful for the setting of the flashlights 14 into a desired position.

The flashlight holder device can of course be used for other photographic purposes and positions than the ones described above and illustrated in the drawings. It can be way of example be useful in connection with common portrait photography, and also when photographing objects and interiors, where one will provide an easying-off light without shadows together with a third flashlight, which can be attached on the flashlightshoe 23 of the camera 1, which shoe as a matter of fact is available for another flashlight. When this third flashlight is not used, nothing impedes the use of an angle finder on the camera 1.

Because of its construction it is an easy and rapidly performed task to set the device in any desired position, and this is a pre-requisite condition in condition with by way of example the photography of insects. It is also easy to carry along, as it can be folded together and does not occupy any space worth mentioning. It is moreover relatively simple to manufacture thanks to its simple construction, and it is well adapted for use with many different flashlight types, and it can be useful in connection with bellows, special collars, auxiliary lenses and just common photography.

The invention is not limited to the embodiment described above and illustrated in the drawings by way of example only, but can be varied in its details within the scope of the following claims.

We claim:

1. A device for supporting a plurality of flashlight units at a camera having a lens with a lens socket defining a central axis, said device comprising: a holder, means for attaching said holder to said lens socket, at least two first arm means connected to said holder at diametrically opposite positions so as to be pivotable about first axes on opposite sides of said socket and at right angles to said central axis, said first arm means having ends remote from said socket, and at least two second arm means respectively pivotally connected to said remote ends so as to be pivotable about second axes, and at least two flashlight units respectively supported on said second arm means.

2. A device according to claim 1, wherein said first axis and said second axis, on one and the same side of said lens socket, extend at right angle relative to each other and in a common plane.

3. A device according to claim 1 or 2, wherein each of said first arm means comprises two arm sections extending at right angle with respect to each other.

4. A device according to claim 3, wherein said arm sections are of the same length.

5. A device according to claim 3, wherein each of said second arm means comprises a flat, straight bar, and means for pivotally mounting the respective flashlight unit on said bar so as to be pivotable about an axis parallel to said second axes.

6. A device according to claim 5, wherein each of said flashlight units comprises a window which is substantially in the same plane as the front of said lens socket when said first and second arm means, on one and the same side of said socket, are arranged at right angle relative to each other, and the common plane of said axes is parallel to the front of the lens.

7. A device according to claim 1 or 2, comprising bearings respectively defining said first and second axes, said bearings comprising friction locking bearings.

8. A device according to claim 7, wherein said bearings defining said first axes comprise contact means for transmitting transferable information between the respective flashlight unit and said holder and a trigger device for said respective flashlight unit.

9. A device according to claim 6, wherein a lower part of the window of the respective flashlight unit is essentially in line with the first axis of the respective arm means to which said flashlight unit pertains and in line with said central axis.

* * * * *